(12) United States Patent
Thoemmes

(10) Patent No.: US 11,409,573 B2
(45) Date of Patent: Aug. 9, 2022

(54) FUNCTION PARALLELISM IN A RUNTIME CONTAINER OF A FUNCTION-AS-A-SERVICE (FAAS) SYSTEM

(71) Applicant: RED HAT, INC., Raleigh, NC (US)

(72) Inventor: Markus Thoemmes, Grasbrunn (DE)

(73) Assignee: Red Hat, Inc., Raleigh, NC (US)

( * ) Notice: Subject to any disclaimer, the term of this patent is extended or adjusted under 35 U.S.C. 154(b) by 90 days.

(21) Appl. No.: 16/936,007

(22) Filed: Jul. 22, 2020

(65) Prior Publication Data

US 2022/0027203 A1 Jan. 27, 2022

(51) Int. Cl.
| | | |
|---|---|---|
| *G06F 9/455* | (2018.01) | |
| *G06F 9/46* | (2006.01) | |
| *G06F 9/50* | (2006.01) | |
| *G06F 9/38* | (2018.01) | |
| *G06F 9/48* | (2006.01) | |

(52) U.S. Cl.
CPC .......... *G06F 9/5055* (2013.01); *G06F 9/3836* (2013.01); *G06F 9/45516* (2013.01); *G06F 9/485* (2013.01)

(58) Field of Classification Search
CPC .. G06F 9/5055; G06F 9/3836; G06F 9/45516; G06F 9/485
USPC ........................................................ 718/104
See application file for complete search history.

(56) References Cited

U.S. PATENT DOCUMENTS

| | | | | |
|---|---|---|---|---|
| 11,050,607 B2 * | 6/2021 | Krohling | ............ | H04L 63/0227 |
| 2018/0375712 A1 | 12/2018 | Krohling et al. | | |
| 2019/0149480 A1 * | 5/2019 | Singhvi | ................... | H04L 47/78 |
| | | | | 709/226 |
| 2020/0057676 A1 | 2/2020 | Vaikar | | |
| 2020/0007378 A1 | 3/2020 | Hortala et al. | | |
| 2020/0081745 A1 | 3/2020 | Cybulski et al. | | |
| 2020/0228602 A1 * | 7/2020 | Spoczynski | ........... | G06F 9/5072 |
| 2021/0064437 A1 * | 3/2021 | Tandon | ............... | G06F 13/3625 |

FOREIGN PATENT DOCUMENTS

WO WO-2020226659 A1 * 11/2020 ........... H04L 41/046

OTHER PUBLICATIONS

Sunil, (Sep. 5, 2019). "AWS Serverless Architecture(AWS Lambda)", 6 pages.
Bramas, B. et al. (Mar. 18, 2019). "Increasing the degree of parallelism using speculative execution in task-based runtime systems", PeerJ Computer Science, 5:e183, http://doi.org/10.7717/peerj-cs.183.

(Continued)

*Primary Examiner* — Bradley A Teets
(74) *Attorney, Agent, or Firm* — Womble Bond Dickinson (US) LLP

(57) ABSTRACT

A method includes receiving a first request to execute a first instance of a function and generating a runtime container to execute the first instance of the function. The runtime instance includes a set of resources allocated to execute the function. The method further includes determining a consumption of the set of resources allocated to the runtime container in view of execution of the first instance of the function. The method further includes, in response to receiving a second request to execute a second instance of the function, initiating the second instance of the function within the runtime container in view of the consumption of the set of resources.

14 Claims, 6 Drawing Sheets

(56) References Cited

OTHER PUBLICATIONS

Leitner, P. et al. (Jun. 26, 2018). "A Mixed-Method Empirical Study of Function-as-a-Service Software Development in Industrial Practice", Peerj Preprints, 24 pages.

Shahrad, M. et al. (Oct. 12-16, 2019). "Architectural Implications of Function-as-a-Service Computing". Micro-52, 13 pages.

* cited by examiner

FUNCTION PARALLELISM IN A RUNTIME CONTAINER OF A FUNCTION-AS-A-SERVICE (FAAS) SYSTEM

TECHNICAL FIELD

Aspects of the present disclosure relate to function parallelism in a runtime container of a FaaS system while maintaining non-parallel functionality.

BACKGROUND

A function as a service (FaaS) platform may be a platform to execute a piece of code (i.e., a function) in response to the occurrence of an event, such as an http request. A user or developer may define a function that is to be provided to and executed on the FaaS system as part of a larger application/program.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

DETAILED DESCRIPTION

Figure 1:
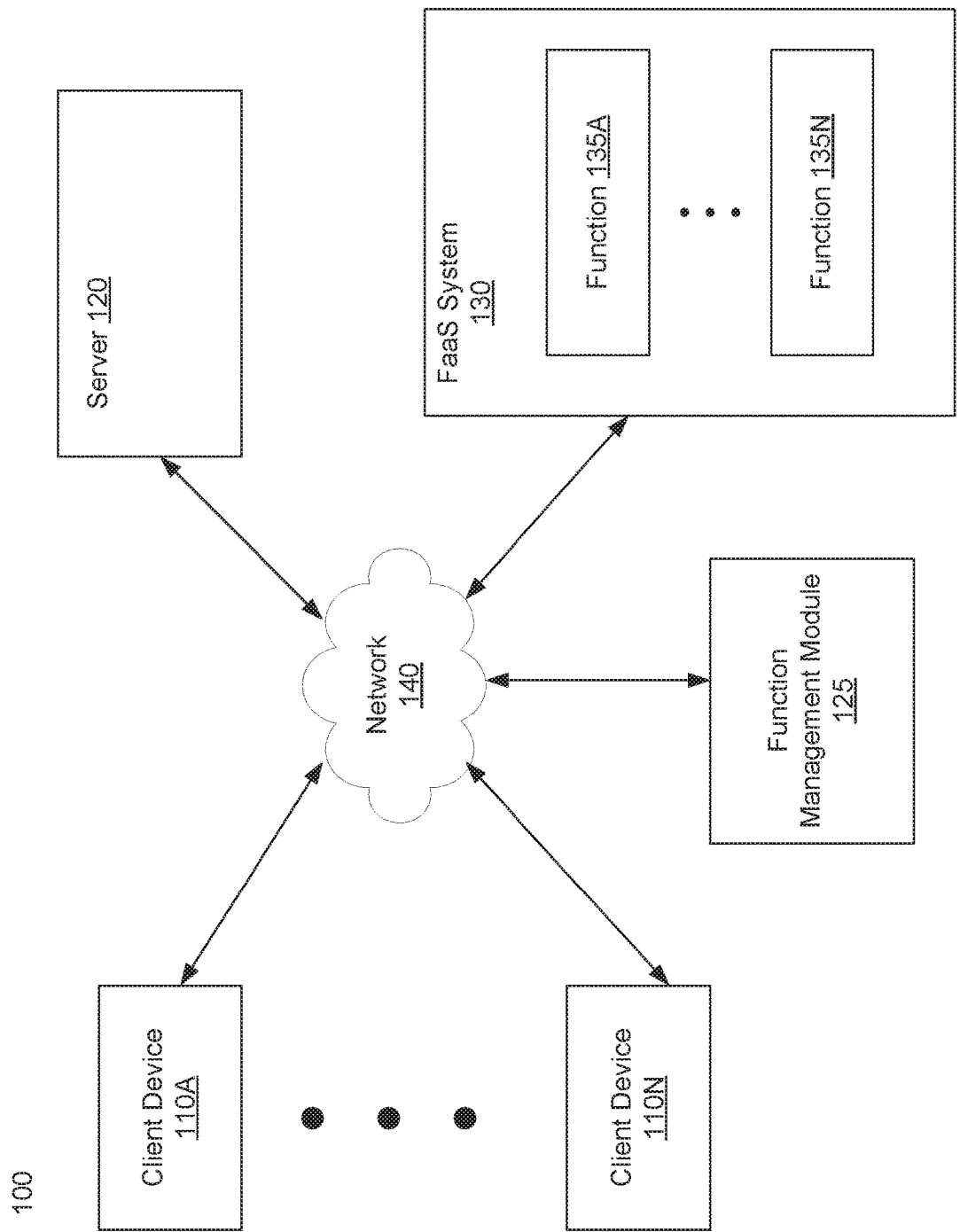
FIG. 1 is a system diagram that illustrates an example FaaS system for supporting function parallelism in a runtime container, in accordance with some embodiments.

FaaS systems generally support a concurrency of one request for a function instance in a single runtime container of the function. Upon receiving a request or triggering event to execute a function, a runtime container may be generated to execute the function. The runtime container may be allocated a particular amount of resources for executing the instance of the function. The instance of the function is then executed by the FaaS system within the runtime container. Each time a new request is received a new runtime container is generated to run a single instance of the function. In some instances, concurrent requests may be received and therefore multiple runtime containers, each with a single instance of the function, may be running at the same time.

However, in many cases allowing only one function instance within a runtime container may be highly inefficient for the FaaS platform. In particular, the function instance may not utilize all or even a large portion of the allocated resource. Because the runtime container is allocated a particular amount of resources upon creation, if the function instance does not use a substantial portion of the allocated resources, the resources not used by the function instance may remain idle, resulting in a significant waste of resources. The waste of allocated resources may be substantially exacerbated if a large number of requests for a function are concurrently received.

Aspects of the disclosure address the above-noted and other deficiencies by providing for function parallelism in a runtime container of a FaaS system. In particular, when a request to execute a function is received and a first function instance is instantiated within a runtime container, processing logic may monitor the resource utilization of the runtime container and the first function instance. If the resource utilization is less than a threshold utilization (e.g., a percentage of the allocated resources), then additional requests for instances of the function may be instantiated within the same runtime container until the threshold utilization is reached.

More specifically, the processing logic may first monitor the runtime container to determine the resources consumed by the runtime container itself. Then the processing logic may monitor the execution of the first function instance to determine the amount of resources consumed by the first function instance. The processing logic may then determine whether the allocated resources include enough unused resources to execute an additional instance of the function within the runtime container. In one example, the processing logic may determine a number of function instances that may be safely (e.g., without risk of exceeding the amount of allocated resources) executed within the runtime container. The processing logic may then instantiate up to the determined number of allowed function instances to the runtime container in response to concurrent requests for the function.

Accordingly, the present disclosure provides for advantages over conventional systems. Particularly, the present disclosure provides for function instance parallelism within a runtime container while providing single instance functionality. Fewer resources are wasted as in creating and running a single runtime container for each function instance. Functions may be instantiated and executed more quickly since the functions may not have to wait for additional runtime containers to be created. Resources may be allocated more efficiently to reduce overhead and maximize actual resource utilization and function throughput. Furthermore, because compute time may be used to calculate user payment, the more efficient use of resources provides for more revenue with the same amount of available resources.

FIG. 1 is an example system for function instance parallelism within a runtime container. System 100 may include one or more client devices 110A-N, one or more servers 120, a function as a service (FaaS) system 130, and a function management module 125 each connected via a network 140. Client devices 110A-N may be any data processing device, such as a desktop computer, a laptop computer, a mainframe computer, a personal digital assistant, a rack-mount server, a hand-held device or any other device configured to process data. The client devices 110A-N and the server 120 may execute one or more applications that may include a function to be stored and executed at the FaaS system 130. Network 140 may be any type of network such as a public network (e.g., the Internet), a private network (e.g., a local area network (LAN), Wi-Fi, or a wide area network (WAN)), or a combination thereof.

Server 120 may be any type of server, such as an application server, a web server, an FTP server, or any other type of server with which a user device can communicate. The FaaS system 130 may store and/or receive one or more functions 135A-N for execution at the FaaS system 130 in response to an event, such as an http request. Functions 135A-N may include any type of mathematical function, business logic, or any other portion of a web applications, server applications, or any other software.

Function management module 125 may be a part of FaaS system 130 and/or in communication with the FaaS system 130. The function management module 125 may also be in communication with a load balancer associated with the FaaS system 130. In one example, the function management module 125 may monitor resource consumption of runtime containers executing one of the functions 135A-N on the FaaS system 130. The function management module 125 may determine whether one or more additional function instances can be executed within the runtime container in view of the resource consumption. The function management module 125 may communicate with a load balancer of the FaaS system 130 to instantiate additional function instances within the already executing runtime container.

Figure 2:
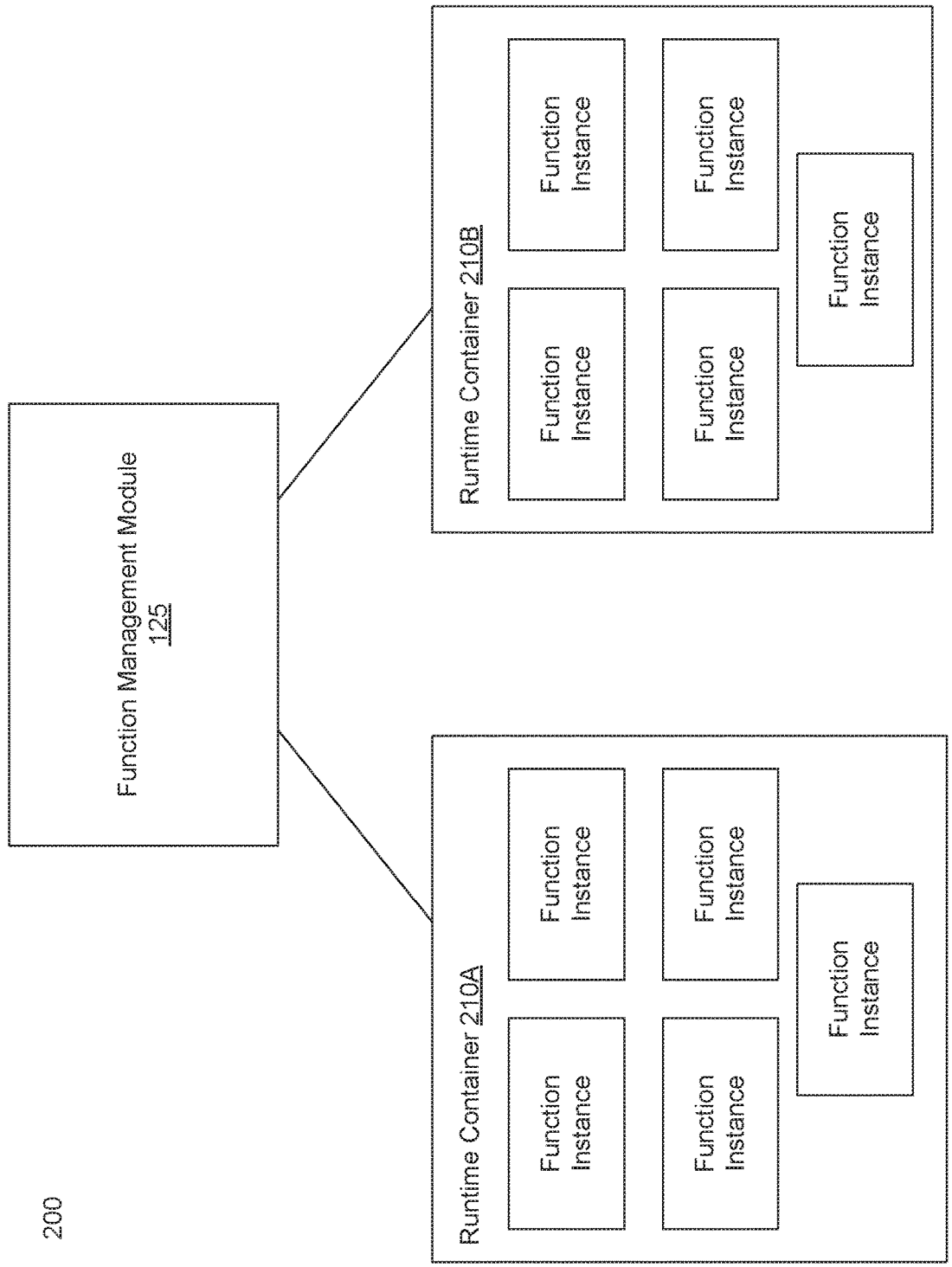
FIG. 2 is a block diagram that illustrates another example of a FaaS system using function parallelism in a runtime container while maintaining non-parallel behavior, in accordance with embodiments of the disclosure.

FIG. 2 is a block diagram that illustrates a system for managing function instances in runtime containers on a function as a service (FaaS) system. The system 200 may include a function management module 125. The function management module 125 may be the same or similar to function management module 125 of FIG. 1. The function management module 125 may be included in, or in communication with, a load balancer of a FaaS system. The function management module 125 may monitor resource consumption of a runtime container and the function instances executing within the runtime containers. The function management module 125 may then direct the load balancer to instantiate function instances in view of the resource consumption of the runtime containers.

For example, upon receiving a request to execute a function on a FaaS system, the system may create a runtime instance, e.g., runtime container 210A. The system 200 may allocate a set of resources to the runtime container 210 for executing an instance of the function for the request. The function management module 125 may monitor consumption of the allocated resources by the runtime container 210 as well as the resource consumption by the first instance of the function. In one example, the runtime container 210 is allocated more resources than necessary to execute the function instance. In such a case, the function management module 125 may determine that additional instances of the function may be executed within the runtime container 210A using the extra allocated resources. Upon each newly received request to execute the function, a new function instance may be instantiated and executed within the runtime container if the function management module 125 has determined that there are sufficient resources.

In one example, the function management module 125 may determine a number of function instances that may be safely executed within the runtime container 210A. The function management module may then direct a load balancer to instantiate the determined number of function instances within the runtime container 210A. If a new request is received and the runtime container 210 has reached the maximum number of function instances, an additional runtime container 210B may be created to execute another function instance in response to the request. Accordingly, the function management module 125 may determine whether a runtime container 210A or 210B has available resources and direct new function instances to a runtime container with available resources.

Figure 3:
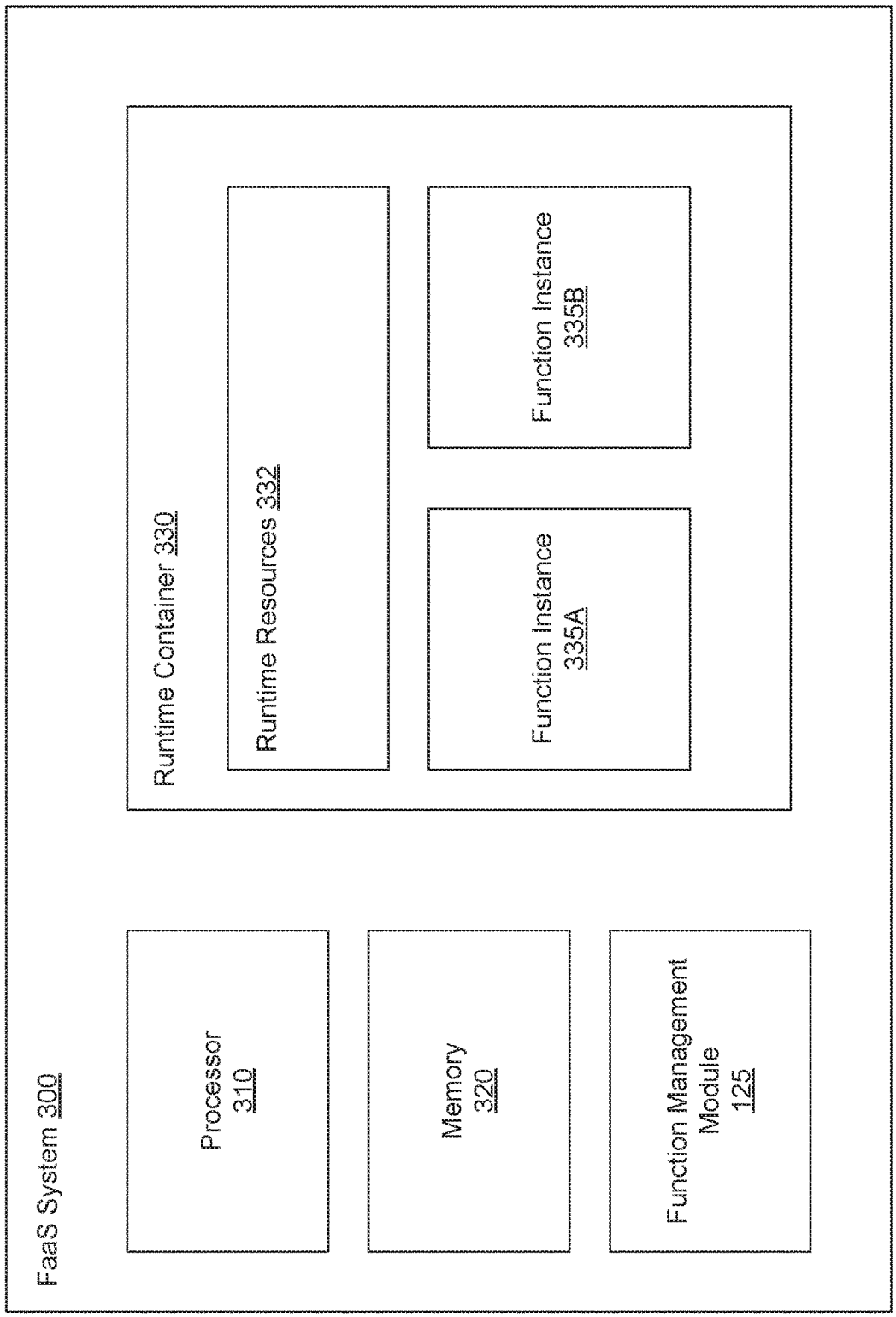
FIG. 3 is a block diagram that illustrates another example of a FaaS system using function parallelism in a runtime container while maintaining non-parallel behavior, in accordance with embodiments of the disclosure.

FIG. 3 is a system diagram illustrating a function as a service (FaaS) system supporting function instance parallelism within a runtime container. FaaS system 300 may include a processor 310, a memory 320, and a function management module 125. The function management module 125 may be the same or similar to function management module 125 of FIG. 1. One or more runtime containers 330 may run on the processor(s) 310 of the FaaS system 300. Each runtime container 330 may be allocated a set of runtime resources 332 to run one or more function instances (e.g., function instances 335A-B). The function management module 125 may monitor the runtime container 330 and at least one of the function instances 335A-B. In one example, the function management module first determines a baseline consumption of the runtime resources 332 by the runtime container 330. The function management module 125 may then determine consumption of the runtime resources 332 by the runtime container 330 and a function instance (e.g., 335A). The function management module 125 may then determine the maximum resource consumption of a function instance based on the difference between the runtime container resource consumption and consumption during execution of the function instance. The function management module 125 may then determine if, and how many, additional function instances may be executed in the runtime container 330 based on the resource consumption of the function instance 335A and the amount of runtime resources 332 allocated to the runtime container 330.

For example, runtime resources 332 may include a set of processor 310 resources (e.g., CPU cycles), memory 320 resources (e.g., an amount of RAM), networking resources, etc. A function may be defined and stored on the FaaS system 300. The function may define the runtime resources 332 to be allocated for the runtime container 330 to execute the function. An instance of the function (e.g., 335A or 335B) may utilize a portion of the processor resources, memory resources, and networking resources, etc. The function management module 125 may determine whether there are sufficient amounts of each resource to run an additional function instance in the runtime container 330. In one example, the function management module 125 may determine if a threshold amount of resources are available to execute the additional function instance. The threshold amount of resources may be determined based on the resource consumption of a single function instance. For example, the threshold amount that must be available may be equal to or greater than the resource consumption of a single function instance. For example, the threshold amount may be a set percentage larger than the resource consumption of a single function to provide a cushion such that the function instances may be safely executed within the runtime resources 332.

In one example, function instances 335A-B may be separated from each other in memory. Function instance 335A may be unable to access the state of function instance 335B and vice versa. In one example, function instances 335A-B may each be run as a Java thread to keep the instances separate. In another example, each function instance 335A-B may be run as a separate process within an operating system of the FaaS system 300 or runtime container 330. In one example, a memory boundary may be created between function instances 335A-B using primitive variables/functions of a programming language used by the FaaS system 300, the runtime container 330, and/or the function instances 335A-B.

Figure 4:
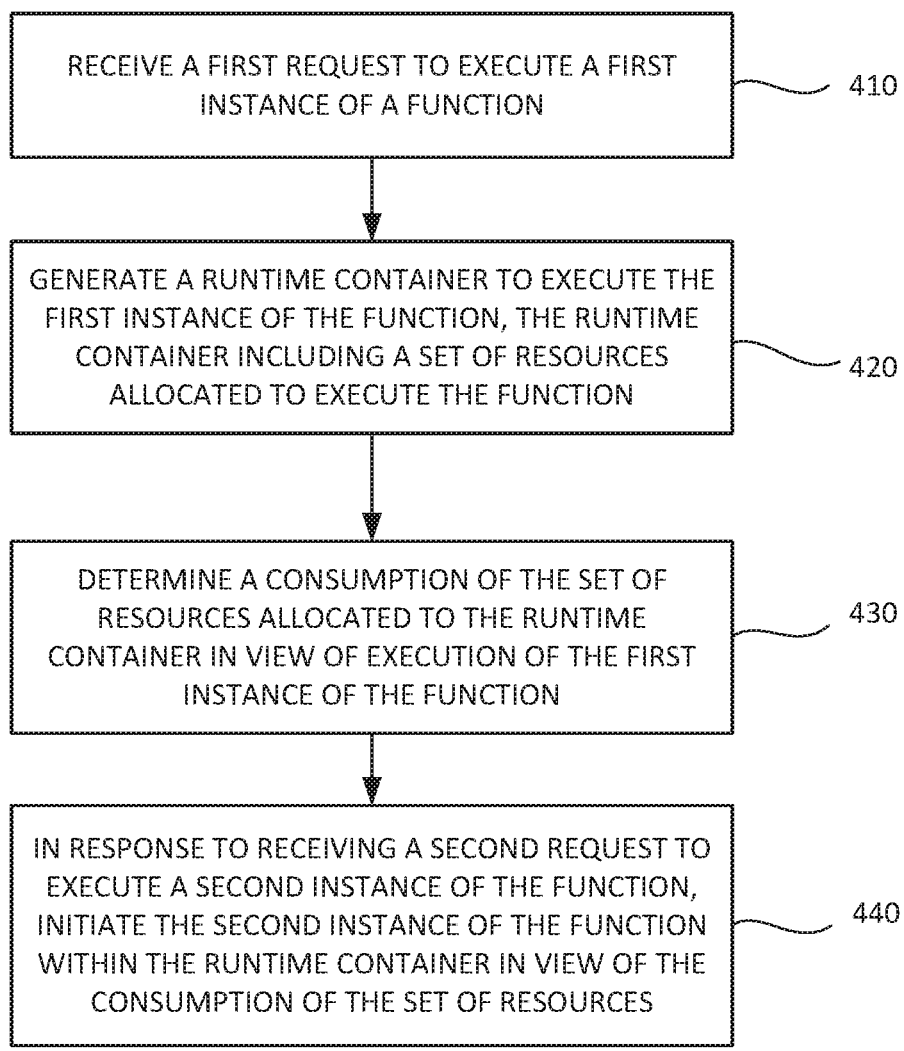
FIG. 4 is a flow diagram of a method of supporting function parallelism in a runtime container of a FaaS system, in accordance with some embodiments.

FIG. 4 is a flow diagram of a method 400 of providing function parallelism in a runtime container of a FaaS system, in accordance with some embodiments. Method 400 may be performed by processing logic that may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. In some embodiments, at least a portion of method 400 may be performed by a function management module 125 of FIG. 1.

With reference to FIG. 4, method 400 illustrates example functions used by various embodiments. Although specific function blocks ("blocks") are disclosed in method 400, such blocks are examples. That is, embodiments are well suited to performing various other blocks or variations of the blocks recited in method 400. It is appreciated that the blocks in method 400 may be performed in an order different than presented, and that not all of the blocks in method 400 may be performed.

Method 400 begins at block 410, where the processing logic receives a first request to execute a first instance of a function. The request may be an http request and may be in response to the occurrence of an event. The event may be a database event, an http request, a user input of an application, or other events received at a FaaS system. The function may be a snippet of code provided to the FaaS system to be executed in response to a request (e.g., the first request). The snippet of code may include any form of business logic, mathematical function, or other software logic. In one example, the function may be logic to tie several other systems together (e.g., a database to a web application or other systems).

At block 420, the processing logic generates a runtime container to execute the first instance of the function, the runtime container including a set of resources allocated to execute the function. The runtime container may be an isolated execution environment in which instances of the function are to execute. In one example, the runtime container may be an http server to receive and execute function instances. A function instance may not handle http requests and thus may be wrapped in the http server to receive and respond to http requests. In one example, generating the runtime container may include allocating the set of resources to the runtime container based on the first function instance to be instantiated in the runtime container. For example, the first instance of the function may define the set of resources to be allocated to the runtime container. The runtime container may then be instantiated using the allocated set of resources. The set of allocated resources may be a set number of processing cycles, a determined set amount of memory, a set amount of networking capabilities, and any other hardware or software resources needed to execute the function.

At block 430, the processing logic determines a consumption of the set of resources allocated to the runtime container in view of execution of the first instance of the function. Determining a consumption of the set of resources in view of the first instance may include monitoring an amount of the allocated resources that are used by the runtime instance and the first instance of the function. In this way, the processing logic may determine if the runtime container includes enough resources to execute another function instance (i.e., if the runtime container includes enough headroom for multiple function instances). In one example, the processing logic may determine a maximum number of function instances that may execute within the runtime container.

At block 440, in response to receiving a second request to execute a second instance of the function, the processing logic initiates the second instance of the function within the runtime container in view of the consumption of the set of resources. If determined at block 430 that the runtime instance includes enough resources to execute another instance of the function, when the second request is received the second instance can be executed within the runtime container. The first and second function instances may not access or modify the state of the other function instance within the container. In one example, the first function instance may be isolated in memory from the second function instance. The first instance of the function and the second instance of the function may then execute concurrently and/or in parallel within the runtime instance. For example, function instances may be separated from each other in memory. In one example, function instances may each be run as a Java thread to keep the instances separate. In another example, each function instance may be run as a separate process within an operating system of the FaaS system or runtime container. In one example, a memory boundary may be created between function instances using primitive variables/functions of a programming language used by the FaaS system or runtime container.

Figure 5:
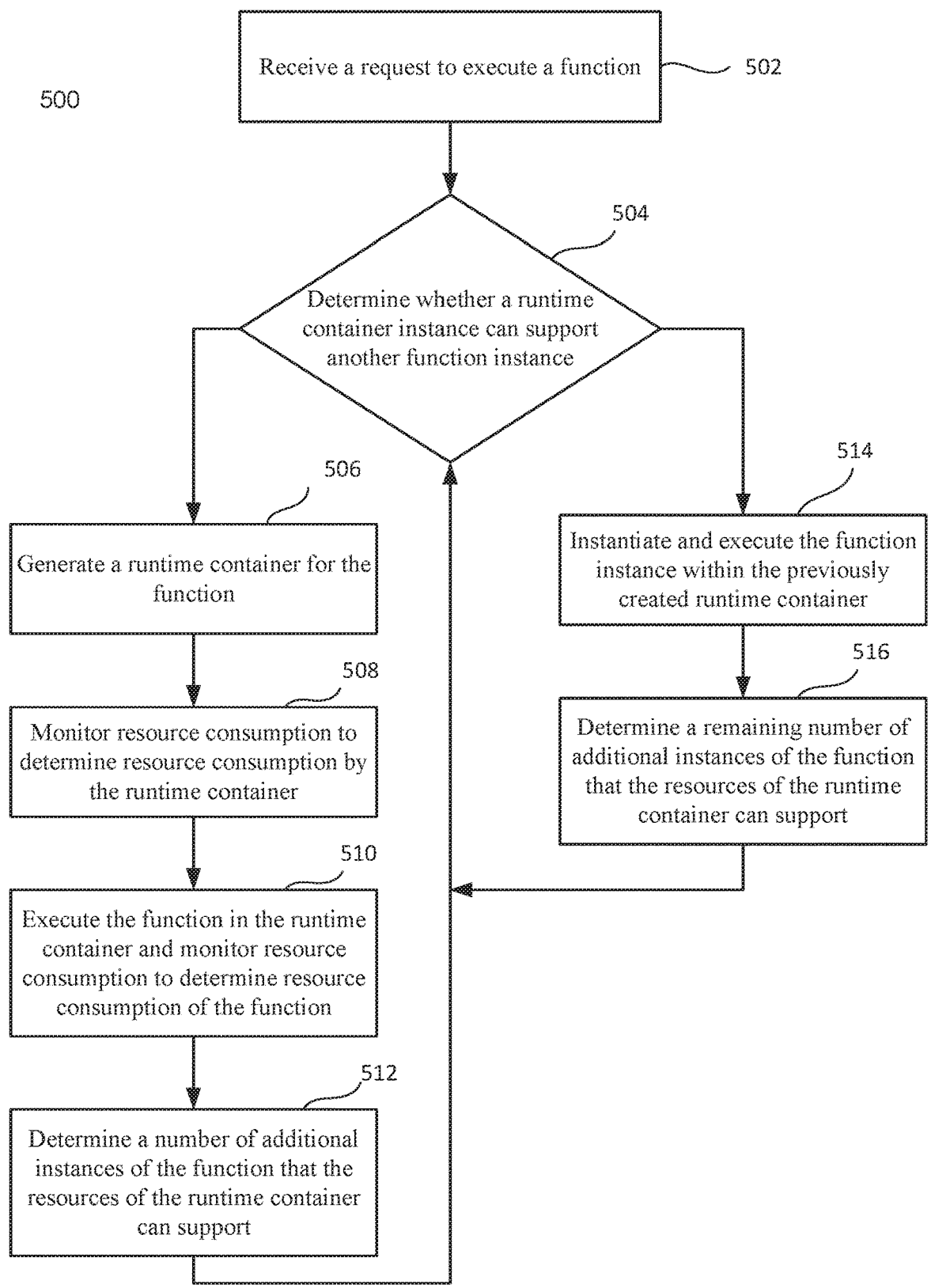
FIG. 5 is a flow diagram of another method of supporting function parallelism in a runtime container of a FaaS system, in accordance with some embodiments.

FIG. 5 is a flow diagram of a method 500 of providing function parallelism in a runtime container of a FaaS system, in accordance with some embodiments. Method 500 may be performed by processing logic that may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. In some embodiments, at least a portion of method 400 may be performed by a function management module 125 of FIG. 1.

With reference to FIG. 5, method 500 illustrates example functions used by various embodiments. Although specific function blocks ("blocks") are disclosed in method 500, such blocks are examples. That is, embodiments are well suited to performing various other blocks or variations of the blocks recited in method 500. It is appreciated that the blocks in method 500 may be performed in an order different than presented, and that not all of the blocks in method 00 may be performed.

Method 500 begins at block 502, where the processing logic receives a request to execute a function. The request may be an http request, a request to access a database, a request generated based on user input of an application, or any other request in response to an event. The function may be a portion of code to be executed in response to the request/event. The portion of code may receive one or more inputs and return a response of one or more generated outputs of the function.

At block 504, the processing logic determines whether a runtime container instance can support another function instance. The runtime container instance may be allocated a set of resources for executing a function instance. In some examples, the function instance may not use all or even a substantial portion of the allocated resources. Therefore, the processing logic may determine that the runtime container instance may execute one or more additional function instances using the unused resources of the set of allocated resources. In one embodiment, as described in more detail with respect to blocks 506-512, the processing logic may monitor consumption of the allocated resources to determine a number (e.g., a maximum number) of function instances that may safely be executed within the runtime container.

Therefore, at block 504, the processing logic may simply determine whether the maximum number of function instances executing within the runtime container has been reached. If the processing logic determines that no more instances can be supported by currently executing runtime instances or that there are no runtime instances available, the method continues to block 506. However, if the processing logic determines that a runtime container instance can support an additional function instance for the received request, the method continues to block 514.

At block 506, in response to determining that there is no runtime container that can support the additional function instance for the received request, the processing logic generates a runtime container for the function. The runtime container may be an isolated environment to execute one or more functions. In one example, the runtime container may be an http server to receive and responds to http requests for the function instances. As discussed above, the runtime container may be allocated a set of resources of a computer system (i.e., a FaaS system) to execute instances of the function. In one example, the request to execute the function and/or the function itself may indicate an amount of resources to be allocated to the runtime container. In another example, the runtime container may be allocated at least a minimum amount of resources.

At block 508, the processing logic monitors resource consumption to determine resource consumption by the runtime container. The runtime container itself may utilize a portion of the allocated resources when running. Therefore, the processing logic may monitor the resource consumption of the runtime container by itself to determine a baseline for resources available for function instance execution.

At block 510, the processing logic executes the function in the runtime container and monitors resource consumption to determine resource consumption of the function. After the baseline of available resources is determined, the processing logic may monitor total resource consumption of a function instance executing in the runtime container. Therefore, the processing logic may determine the maximum resource consumption of an instance of the function by subtracting the resource consumption of the runtime instance from the total resource consumption while executing a function instance.

At block 512, the processing logic determines a number of additional instances of the function that the resources of the runtime container can support. Once the baseline of available resources for function instances is determined at block 508 and the resource consumption of a single function is determined at block 510, the processing logic may determine how many function instances may be executed by the resources allocated to the runtime container. In one example, the processing logic may determine the number of function instances by dividing the amount of available resources by the resource consumption of a single function instance (e.g., for each resource of the set of resources). In another example, the processing logic may determine a threshold amount of resources to be left available so that the function instances can safely execute within the resource constraints. For example, additional instances may be added to the runtime container up to some threshold utilization of resources (e.g., 90% utilization, 10% available). The threshold may be determined individually for each defined function or may be provided by a user or administrator to ensure safe operation.

At block 514, in response to determining at block 504 that a runtime container instance can support the function instance from the request, the processing logic instantiates and executes the function instance within the previously created runtime container. At block 516, the processing logic determines a remaining number of additional instances of the function that the resources of the runtime container can support. As discussed above, the processing logic may determine the number of function instances that a runtime container can execute safely. Thus, the processing logic may store this number and decrement it by one every time a new function instance is instantiated, and increment it by one every time a function instance completes execution and is retired. Therefore, the processing logic can track the remaining number of instances that each runtime container can support.

Figure 6:
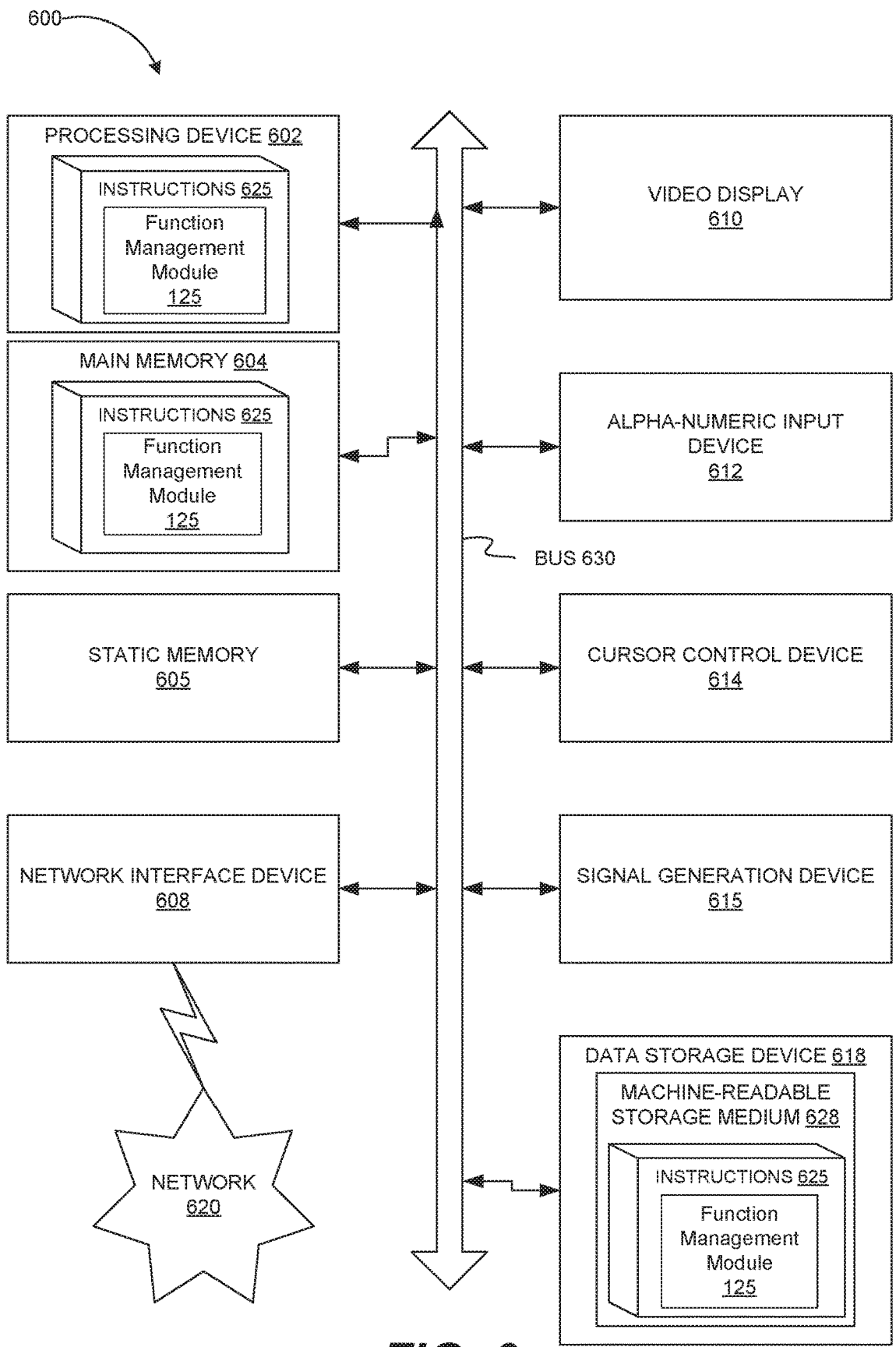
FIG. 6 is a block diagram of an example apparatus that may perform one or more of the operations described herein, in accordance with some embodiments of the present disclosure.

FIG. 6 is a block diagram of an example computing device 600 that may perform one or more of the operations described herein, in accordance with some embodiments. Computing device 600 may be connected to other computing devices in a LAN, an intranet, an extranet, and/or the Internet. The computing device may operate in the capacity of a server machine in client-server network environment or in the capacity of a client in a peer-to-peer network environment. The computing device may be provided by a personal computer (PC), a set-top box (STB), a server, a network router, switch or bridge, or any machine capable of executing a set of instructions (sequential or otherwise) that specify actions to be taken by that machine. Further, while only a single computing device is illustrated, the term "computing device" shall also be taken to include any collection of computing devices that individually or jointly execute a set (or multiple sets) of instructions to perform the methods discussed herein.

The example computing device 600 may include a processing device (e.g., a general purpose processor, a PLD, etc.) 602, a main memory 604 (e.g., synchronous dynamic random access memory (DRAM), read-only memory (ROM)), a static memory 606 (e.g., flash memory and a data storage device 618), which may communicate with each other via a bus 630.

Processing device 602 may be provided by one or more general-purpose processing devices such as a microprocessor, central processing unit, or the like. In an illustrative example, processing device 602 may comprise a complex instruction set computing (CISC) microprocessor, reduced instruction set computing (RISC) microprocessor, very long instruction word (VLIW) microprocessor, or a processor implementing other instruction sets or processors implementing a combination of instruction sets. Processing device 602 may also comprise one or more special-purpose processing devices such as an application specific integrated circuit (ASIC), a field programmable gate array (FPGA), a digital signal processor (DSP), network processor, or the like. The processing device 602 may be configured to execute the operations described herein, in accordance with one or more aspects of the present disclosure, for performing the operations and steps discussed herein.

Computing device 600 may further include a network interface device 608 which may communicate with a network 620. The computing device 600 also may include a video display unit 610 (e.g., a liquid crystal display (LCD) or a cathode ray tube (CRT)), an alphanumeric input device 612 (e.g., a keyboard), a cursor control device 614 (e.g., a mouse) and an acoustic signal generation device 616 (e.g., a speaker). In one embodiment, video display unit 610, alphanumeric input device 612, and cursor control device 614 may be combined into a single component or device (e.g., an LCD touch screen).

Data storage device 618 may include a computer-readable storage medium 628 on which may be stored one or more sets of instructions 625 that may include instructions for a function management module, e.g., function management module 125, for carrying out the operations described herein, in accordance with one or more aspects of the present disclosure. Instructions 625 may also reside, completely or at least partially, within main memory 604 and/or within processing device 602 during execution thereof by computing device 600, main memory 604 and processing device 602 also constituting computer-readable media. The instructions 625 may further be transmitted or received over a network 620 via network interface device 608.

While computer-readable storage medium 628 is shown in an illustrative example to be a single medium, the term "computer-readable storage medium" should be taken to include a single medium or multiple media (e.g., a centralized or distributed database and/or associated caches and servers) that store the one or more sets of instructions. The term "computer-readable storage medium" shall also be taken to include any medium that is capable of storing, encoding or carrying a set of instructions for execution by the machine and that cause the machine to perform the methods described herein. The term "computer-readable storage medium" shall accordingly be taken to include, but not be limited to, solid-state memories, optical media and magnetic media.

Unless specifically stated otherwise, terms such as "receiving," "routing," "updating," "providing," or the like, refer to actions and processes performed or implemented by computing devices that manipulates and transforms data represented as physical (electronic) quantities within the computing device's registers and memories into other data similarly represented as physical quantities within the computing device memories or registers or other such information storage, transmission or display devices. Also, the terms "first," "second," "third," "fourth," etc., as used herein are meant as labels to distinguish among different elements and may not necessarily have an ordinal meaning according to their numerical designation.

Examples described herein also relate to an apparatus for performing the operations described herein. This apparatus may be specially constructed for the required purposes, or it may comprise a general purpose computing device selectively programmed by a computer program stored in the computing device. Such a computer program may be stored in a computer-readable non-transitory storage medium.

The methods and illustrative examples described herein are not inherently related to any particular computer or other apparatus. Various general purpose systems may be used in accordance with the teachings described herein, or it may prove convenient to construct more specialized apparatus to perform the required method steps. The required structure for a variety of these systems will appear as set forth in the description above.

The above description is intended to be illustrative, and not restrictive. Although the present disclosure has been described with references to specific illustrative examples, it will be recognized that the present disclosure is not limited to the examples described. The scope of the disclosure should be determined with reference to the following claims, along with the full scope of equivalents to which the claims are entitled.

As used herein, the singular forms "a", "an" and "the" are intended to include the plural forms as well, unless the context clearly indicates otherwise. It will be further understood that the terms "comprises", "comprising", "includes", and/or "including", when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Although the method operations were described in a specific order, it should be understood that other operations may be performed in between described operations, described operations may be adjusted so that they occur at slightly different times or the described operations may be distributed in a system which allows the occurrence of the processing operations at various intervals associated with the processing.

Various units, circuits, or other components may be described or claimed as "configured to" or "configurable to" perform a task or tasks. In such contexts, the phrase "configured to" or "configurable to" is used to connote structure by indicating that the units/circuits/components include structure (e.g., circuitry) that performs the task or tasks during operation. As such, the unit/circuit/component can be said to be configured to perform the task, or configurable to perform the task, even when the specified unit/circuit/component is not currently operational (e.g., is not on). The units/circuits/components used with the "configured to" or "configurable to" language include hardware—for example, circuits, memory storing program instructions executable to implement the operation, etc. Reciting that a unit/circuit/component is "configured to" perform one or more tasks, or is "configurable to" perform one or more tasks, is expressly intended not to invoke 35 U.S.C. 112, sixth paragraph, for that unit/circuit/component. Additionally, "configured to" or "configurable to" can include generic structure (e.g., generic circuitry) that is manipulated by software and/or firmware (e.g., an FPGA or a general-purpose processor executing software) to operate in manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks. "Configurable to" is expressly intended not to apply to blank media, an unprogrammed processor or unprogrammed generic computer, or an unprogrammed programmable logic device, programmable gate array, or other unprogrammed device, unless accompanied by programmed media that confers the ability to the unprogrammed device to be configured to perform the disclosed function(s).

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the embodiments and its practical applications, to thereby enable others skilled in the art to best utilize the embodiments and various modifications as may be suited to the particular use contemplated. Accordingly, the present embodiments are to be considered as illustrative and not restrictive, and the invention is not to be limited to the details given herein, but may be modified within the scope and equivalents of the appended claims.

What is claimed is:

1. A method comprising:
receiving a first request to execute a first instance of a function;
generating a runtime container to execute the first instance of the function, the runtime container comprising a set of resources allocated to execute the function;
determining, by a processing device, a consumption of the set of resources allocated to the runtime container in view of execution of the first instance of the function;
determining a maximum number of instances of the function that the runtime container can support in view of the consumption of the set of resources by the first instance of the function; and
in response to receiving a second request to execute a second instance of the function:
determining whether the runtime container is executing the maximum number of instances of the function; and
in response to determining that the runtime container is executing fewer than the maximum number of instances of the function, initiating the second instance of the function within the runtime container, wherein the first instance of the function and the second instance of the function execute at least partially concurrently within the runtime container, and wherein the first instance of the function is isolated in memory from the second instance of the function such that the first instance of the function cannot interfere with execution of the second instance of the function.

2. The method of claim 1, wherein generating the runtime container comprises:
allocating the set of resources to the runtime container in view of the first instance of the function, wherein the first instance of the function defines the set of resources; and
instantiating the runtime container in view of the allocated set of resources.

3. The method of claim 1, wherein determining the consumption of the set of resources comprises:
determining a first consumption of the set of resources by the runtime container; and
determining a second consumption of the set of resources by execution of the first instance of the function.

4. The method of claim 1, wherein initiating the second instance of the function with the runtime container in view of the consumption of the set of resources comprises:
determining, in view of the set of resources allocated to the runtime container and the consumption of the set of resources, that the set of resources allocated to the runtime container are sufficient to support execution of the second instance of the function and the first instance of the function concurrently.

5. The method of claim 1, wherein the set of resources comprise a set number of processing cycles, a set amount of memory, and a set amount of networking capabilities.

6. A system comprising:
a memory; and
a processing device operatively coupled to the memory, the processing device to:
receive a first request to execute a first instance of a function;
generate a runtime container to execute the first instance of the function, the runtime container comprising a set of resources allocated to execute the function;
determine a consumption of the set of resources allocated to the runtime container in view of execution of the first instance of the function;
determine a maximum number of instances of the function that the runtime container can support in view of the consumption of the set of resources by the first instance of the function; and
in response to receiving a second request to execute a second instance of the function:
determine whether the runtime container is executing the maximum number of instances of the function; and
in response to determining that the runtime container is executing fewer than the maximum number of instances of the function, initiate the second instance of the function within the runtime container in view of the consumption of the set of resources, wherein the first instance of the function and the second instance of the function execute at least partially concurrently within the runtime container, and wherein the first instance of the function is isolated in memory from the second instance of the function such that the first instance of the function cannot interfere with execution of the second instance of the function.

7. The system of claim 6, wherein to generate the runtime container, the processing device is to:
allocate the set of resources to the runtime container in view of the first instance of the function, wherein the first instance of the function defines the set of resources; and
instantiate the runtime container in view of the allocated set of resources.

8. The system of claim 6, wherein to determine the consumption of the set of resources, the processing device is to:
determine a first consumption of the set of resources by the runtime container; and
determine a second consumption of the set of resources by execution of the first instance of the function.

9. The system of claim 6, wherein to initiate the second instance of the function with the runtime container in view of the consumption of the set of resources, the processing device is to:
determine, in view of the set of resources allocated to the runtime container and the consumption of the set of resources, that the set of resources allocated to the runtime container are sufficient to support execution of the second instance of the function and the first instance of the function concurrently.

10. The system of claim 6, wherein the set of resources comprise a set number of processing cycles, a set amount of memory, and a set amount of networking capabilities.

11. A non-transitory computer-readable storage medium including instructions that, when executed by a processing device, cause the processing device to:
receive a first request to execute a first instance of a function;
generate a runtime container to execute the first instance of the function, the runtime container comprising a set of resources allocated to execute the function;

determine, by the processing device, a consumption of the set of resources allocated to the runtime container in view of execution of the first instance of the function;

determine a maximum number of instances of the function that the runtime container can support in view of the consumption of the set of resources by the first instance of the function; and in response to receiving a second request to execute a second instance of the function:

determine whether the runtime container is executing the maximum number of instances of the function; and in response to determining that the runtime container is executing fewer than the maximum number of instances of the function, initiate the second instance of the function within the runtime container in view of the consumption of the set of resources, wherein the first instance of the function and the second instance of the function execute at least partially concurrently within the runtime container, and wherein the first instance of the function is isolated in memory from the second instance of the function such that the first instance of the function cannot interfere with execution of the second instance of the function.

12. The non-transitory computer-readable storage medium of claim 11, wherein to generate the runtime container, the processing device is to:

allocate the set of resources to the runtime container in view of the first instance of the function, wherein the first instance of the function defines the set of resources; and instantiate the runtime container in view of the allocated set of resources.

13. The non-transitory computer-readable storage medium of claim 11, wherein to determine the consumption of the set of resources, the processing device is to:

determine a first consumption of the set of resources by the runtime container; and determine a second consumption of the set of resources by execution of the first instance of the function.

14. The non-transitory computer-readable storage medium of claim 11, wherein to initiate the second instance of the function with the runtime container in view of the consumption of the set of resources, the processing device is to:

determine, in view of the set of resources allocated to the runtime container and the consumption of the set of resources, that the set of resources allocated to the runtime container are sufficient to support execution of the second instance of the function and the first instance of the function concurrently.

* * * * *